Oct. 28, 1924.
C. D. LOVELACE
1,512,992
TRAP GUN MOUNTING
Original Filed July 29, 1922
FIG. 1
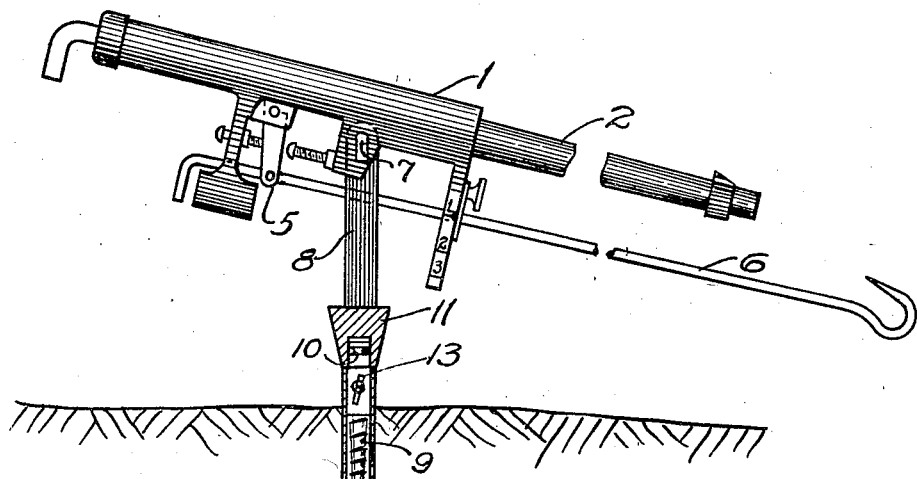
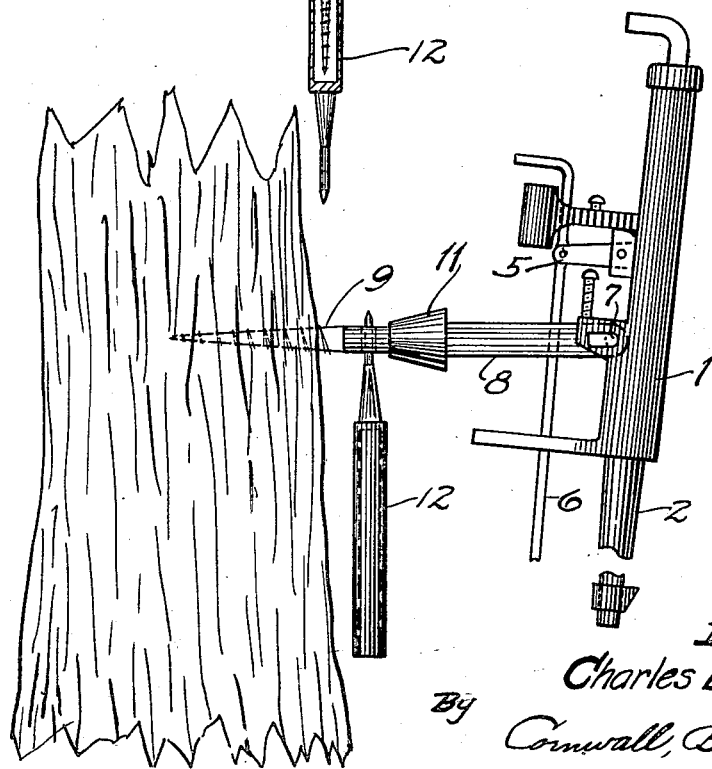
FIG. 2
Inventor
Charles D. Lovelace
By
Cornwall, Bedell & Janus
ATTYS Patented Oct. 28, 1924.

1,512,992

UNITED STATES PATENT OFFICE.

CHARLES D. LOVELACE, OF FORT WORTH, TEXAS.

TRAP-GUN MOUNTING.

Original application filed July 29, 1922, Serial No. 578,360. Patent No. 1,497,758, dated June 17, 1924.
Divided and this application filed May 12, 1924. Serial No. 712,876.

*To all whom it may concern:*

Be it known that I, CHARLES D. LOVELACE, a citizen of the United States, residing at Fort Worth, Texas, have invented a certain new and useful Improvement in Trap-Gun Mountings, of which the following is a specification, such as will enable others skilled in the art to which it appertains to make and use the same.

My invention relates to trap guns and consists in an improved mounting device for said guns, and this application is a division of my application, Serial Number 578,360, filed July 29, 1922, now Patent Number 1,497,758, patented June 17, 1924.

The object of my invention is to provide a trap gun mounting which is adapted to facilitate the mounting of the gun in the ground or on a log, tree trunk, or other wood base. Briefly, this mounting comprises a wood screw element attached to the mounting member by means of a swivel joint and a substantially hollow stake adapted to receive the screw element and to be detachably secured thereto.

In the accompanying drawings which illustrate my invention,—

Figure 1 is a side elevation of a trap gun with the mounting device arranged to support the gun on the ground.

Figure 2 is a similar elevation showing the mounting device so arranged to support the gun on the trunk of a tree.

The gun includes a breech block 1, a barrel 2, a sear 5 operated by a bait rod 6, and other elements partly illustrated but forming no part of the invention claimed herein.

The gun is pivoted at 7 on a mounting member 8, the lower end of which is socketed and receives the upper end of a wood screw element 9 which is provided with a swivel joint connection to member 8 by means of the annular recess 10 and a pin 11 in the socketed end of member 8.

I also provide a stake member 12 which is hollow throughout the major portion of its length and is open at one end. The hollow portion of stake 12 slidably receives screw 9 and the two are adapted to be detachably secured to each other by means of a cotter 13 inserted through aligned openings 14 in the screw and stake. Obviously, a set screw, bolt or other element may be substituted for cotter 13.

The lower end of stake 12 is pointed for its easier penetration of hard or frozen ground and is so reduced in size that, when the stake and screw are disassembled, it may be inserted in the opening 14 in the head of the screw and used as a lever to rotate the screw. This arrangement is shown in Figure 2 in which the screw is being inserted in the trunk of a tree, the stake being utilized to rotate the screw while pressure may be applied to the screw through member 8 by hand pressure on the breech block of the gun.

It will be seen that with the construction shown, the stake element 12 may be driven into the ground with a hammer, rock or club, and that the gun may then be mounted in the stake and secured thereto by the cotter 13 and without being subjected to any blows. If it is desired to insert the screw in a log, the pointed end of the stake may be driven into the log to provide a starting hole for the screw and the stake may then be used to turn the screw to secure position.

In either mounting, the gun is free to rotate upon the stake and screw axis according to the direction of pull of the animal seizing the bait on rod 6.

Various modifications in the details other than those suggested above may be made without departing from the spirit of my invention as claimed.

I claim:

1. A trap gun mount comprising a member secured to the gun and terminating in a wood screw, and a stake having a recess adapted to slidably receive the screw forming portion of said member.

2. A trap gun mount comprising a member secured to the gun and terminating in a wood screw, a stake having a recess adapted to slidably receive the screw forming portion of said member, and a removable member for retaining said stake on said screw.

3. A trap gun mount comprising a member secured to the gun, a wood screw axially aligned with said member and swiveling thereon, a substantially hollow stake open at one end to slidably receive said screw, and means for locking said screw in said stake.

4. A trap gun mount comprising a member having one end secured to the gun with its other end recessed to receive a supporting element swiveled thereon and projecting therefrom, a stake hollowed to receive said element, said element and stake being provided with transverse openings, and a pin inserted in said openings to positively retain said element in said stake while permitting free turning of said member on said swiveled element.

5. In a trap gun, a supporting member terminating in a screw, provided with a transverse opening, and a stake adapted at one end to receive said screw and adapted at the other end to enter the opening in said screw to serve as a lever to rotate the latter.

In testimony whereof I hereunto affix my signature this 8th day of May, 1924.

CHARLES D. LOVELACE.